(12) United States Patent
Wang et al.

(10) Patent No.: US 7,917,312 B2
(45) Date of Patent: Mar. 29, 2011

(54) PHOTOACOUSTIC DOPPLER FLOW SENSING AND IMAGING

(75) Inventors: Lihong Wang, Creve Coeur, MO (US); Hui Fang, Saint Louis, MO (US); Konstantin Maslov, Affton, MO (US)

(73) Assignee: Washington University, St. Louis, MO (US)

( * ) Notice: Subject to any disclaimer, the term of this patent is extended or adjusted under 35 U.S.C. 154(b) by 163 days.

(21) Appl. No.: 12/254,643

(22) Filed: Oct. 20, 2008

(65) Prior Publication Data
US 2009/0138215 A1  May 28, 2009

Related U.S. Application Data

(60) Provisional application No. 60/981,055, filed on Oct. 18, 2007.

(51) Int. Cl.
*G01F 1/20* (2006.01)
(52) U.S. Cl. .......................................................... 702/45
(58) Field of Classification Search ...................... 702/45
See application file for complete search history.

(56) References Cited

U.S. PATENT DOCUMENTS

| 4,267,732 | A | 5/1981 | Quate |
| 4,430,987 | A | 2/1984 | Heller |
| 4,596,254 | A | 6/1986 | Adrian et al. |
| 4,809,703 | A | 3/1989 | Ishikawa et al. |
| 5,991,697 | A | 11/1999 | Nelson et al. |
| 2005/0217381 | A1 | 10/2005 | Falk |
| 2006/0184042 | A1 | 8/2006 | Wang et al. |

OTHER PUBLICATIONS

Victor X. D. Yang, Optical coherence and Doppler tomography for monitoring tissue changes induced by laser thermal therapy—An in vivo feasibility study, Review of Scientific Instruments, vol. 74, No. 1, Jan. 2003, p. 437-440.*
PCT, Written Opinion Of The International Searching Authority, Date of Mailing, Apr. 22, 2009, International Application No. PCT/US2008/081167, International Filing date, Oct. 24, 2008, pp. 7.
H. Fang, K. Maslov, L. V. Wang, Photoacoustic Doppler Effect from Flowing Small Light-Absorbing Particles, Physical Review Letters, Nov. 2, 2007, pp. 184501 1-4, vol. 99, The American Physical Society, USA.
K. Maslov and L. V. Wang, Photoacoustic Imaging of biological tissue with Intensity-Modulated Continuous-Wave Laser, Journal of Biomedical Optics, 2008, pp. 024006 1-5, vol. 13(2), SPIE, USA.
M. Xu and L. V. Wang, Photoacoustic Imaging in Biomedicine, Review of Scientific Instruments, 2006, pp. 041101 1-22, vol. 77, American Institute of Physics, USA.
X. Wang, Y. Pang, G. Ku, X. Xie, G. Stoica and L. V. Wang, Noninvasive Laser-Induced Photoacoustic Tomography for Structural and Functional in Vivio Imaging of the Brain, Nature Biotechnology, 2003, pp. 803-806, vol. 21, No. 7, Nature Publishing Group, USA.

(Continued)

*Primary Examiner* — Tung S Lau
(74) *Attorney, Agent, or Firm* — Armstrong Teasdale LLP

(57) ABSTRACT

A method for measuring a fluid flow includes employing small light-absorbing particles as tracers that flow at the same speed as the fluid, measuring the photoacoustic Doppler shifts of the photoacoustic signals produced by these tracer particles, and determining, from the measurements, information about the flow including one or more of the flow speed, flow profile, and flow direction.

9 Claims, 11 Drawing Sheets

OTHER PUBLICATIONS

C. G. A. Hoelen, F. F. M. de Mul, R. Pongers and A. Dekker, Three Dimensional Photoacoustic Imaging of Blood Vessels in Tissue, Optics Letters, 1998, pp. 648-650, vol. 23, No. 8, Optical Society of America, USA.

A. Oraevsky and A. Karabutov, Optoacoustic Tomography, Biomedical Photonics Handbook, 2003, pp. 1-40, CRC Press LLC, USA.

R. A. Kruger, P. Liu, Y. R. Fang and C. R. Appledorn, Photoacoustic Ultrasound (PAUS)-Reconstruction Tomography, Med. Phys., Oct. 1995, pp. 1605-1609, vol. 22 (10), Am. Assoc. Phys. Med., USA.

A. G. Bell, On the Production and Reproduction of Sound by Light, American Journal of Sciences, Oct. 1880, pp. 305-324, Third Series, vol. XX, USA.

G. J. Diebold, M. I. Khan, and S. M. Park, Photoacoustic Signature of Particulate Matter: Optical Production of Acoustic Monopole Radiation, Science New Series, Oct. 5, 1990, pp. 101-104, vol. 250, No. 4977, American Association for the Advancement of Science, USA.

A. C. Tam, Applications of Photoacoustic Sensing Techniques, Reviews of Modern Physics, Apr. 1986, pp. 381-431, Figs. 16, 26 and 32, vol. 58, No. 2, The American Physical Society, USA.

H. F. Zhang, K. Maslov, G. Stoica, and L. V. Wang, Functional Photoacoustic Microscopy for High-Resolution and Noninvasive in Vivo Imaging, Nature Biotechnology, Jul. 2006, 848-851, vol. 24, Nature Publishing Group, USA.

A. Oraevsky and A. Karabutov, Ultimate Sensitivity of Time-Resolved Opto-Acoustic Detection, Biomedical Optoacoustics, 2000, pp. 228-239, vol. 3916, SPIE, USA.

K. Maslov, G. Stoica and L. V. Wang, In Vivo Dark-Field Reflection-Mode Photoacoustic Microscopy, Optics Letters, Mar. 15, 2005, pp. 625-627, vol. 30, No. 6, Optical Society of America, USA.

T. J. Allen and P. C. Beard, Pulsed Near-Infrared Laser Diode Excitation System for Biomedical Photoacoustic Imaging, Optics Letters, Dec. 1, 2006, pp. 3462-3464, vol. 31, No. 23, Optical Society of America, USA.

T. W. Murray and O. Balogun, High-Sensitivity Laser-Based Acoustic Microscopy Using a Modulated Excitation Source, Applied Physics Letters, Oct. 4, 2004, pp. 2974-2976, vol. 85, No. 14, American Institute of Physics, USA.

Y. Fan, A. Mandelis, G. Spirou and I. A. Vitkin, Development of a Laser Photothermoacoustic Frequency-Swept System for Subsurface Imaging: Theory and Experiment, J. Acoust. Soc. Am., 2004, pp. 3523-3533, vol. 116, Acoustical Society of America, USA.

I. G. Calasso, W. Craig and G. J. Diebold, Photoacoustic Point Source, Physical Review Letters, Apr. 16, 2001, pp. 3550-3553, vol. 86, No. 16, The American Physical Society, USA.

G. J. Diebold, T. Sun and M. I. Khan, Photoacoustic Monopole Radiation in One, Two and Three Dimensions, Physical Review Letters, Dec. 9, 1991, pp. 3384-3387, Figs. 1 and 2, vol. 67, No. 24, The American Physical Society, USA.

M. Robert, G. Molingou and K. Snook, Fabrication of Focused Poly (Vinylidene Fluoride-Trifluoroethylene) P (VDF-TrFE) Copolymer 40-50 MHz Ultrasound Transducers on Curved Surfaces, Journal of Applied Physics, Jul. 1, 2004, pp. 252-256, vol. 96, No. 1, American Institute of Physics, USA.

R.I. Siphanto, R. G. M. Kolkman, A. Huishes, M. C. Pilatou, F. F. M. de Mul, W. Steenbergen and L. N. van Adrichem, Imaging of Small Vessles Using Photoacoustics: an in Vivo Study, Lasers in Surgery and Medicine, 2004, pp. 354-362, vol. 35, Wiley-Liss, Inc., Netherlands.

Y.Y. Petrov, D. S. Prough, D. J. Deyo, M. Klasing, M. Motamedi and R. O. Esenaliev, Optoacoustic, Nonivasive, Real-Time, Continuous Monitoring of Cerebral Blood Oxygenation: An In Vivo Study in Sheep, Anesthesiology, 2005, pp. 69-75, vol. 102, No. 1, American Society of Anesthesiologists, Inc., Lippincott Williams & Wilkins, Inc., USA.

\* cited by examiner

PHOTOACOUSTIC DOPPLER FLOW SENSING AND IMAGING

CROSS REFERENCE TO RELATED APPLICATIONS

This application claims the benefit of U.S. Provisional Application No. 60/981,055 filed Oct. 18, 2007, which is hereby incorporated by reference in its entirety.

STATEMENT REGARDING FEDERALLY SPONSORED RESEARCH & DEVELOPMENT

This invention was made with government support under grants R01 EB000712 and R01 NS46214, both awarded by the U.S. National Institutes of Health. The government has certain rights in the invention.

BACKGROUND

The subject matter described herein relates generally to photoacoustic Doppler-based flowmetry and, more particularly, to detecting fluid flow in optically scattering media and/or low-speed blood flow of relatively deep microcirculation in biological tissue.

Laser flowmetry and acoustic flowmetry based on the Doppler effect have become valuable tools for fluid mechanics measurements. In addition, low-coherence optical Doppler tomography has been developed for similar applications. Each method requires the presence of small scattering tracer particles to provide detectable backscattering signals. In measurement of tissue blood flow, red blood cells may serve as endogenous scattering tracer particles. At least some known systems based on the photoacoustic Doppler effect use movement of a thermoacoustic array. However, such systems do not involve a flow medium. Rather, a laser beam was scanned over an absorbing liquid and, as a result, the Doppler shift depends on the laser scanning speed.

BRIEF DESCRIPTION

In one aspect, a method for measuring a fluid flow is provided. The method includes employing small light-absorbing particles as tracers that flow at the same speed as the fluid, measuring the photoacoustic Doppler shifts (or the photoacoustic Doppler spectra) of the photoacoustic signals produced by these tracer particles, and determining, from the measurements, information about the flow such as the flow speed, flow profile, and flow direction.

In another aspect, a system is provided for detecting the Doppler shift of an acoustic wave due to intensity-modulated continuous-wave photoacoustic generation from light-absorbing particles. The system includes an intensity-modulated continuous-wave laser configured to illuminate the flowing particles to produce an acoustic wave, an ultrasonic transducer configured to detect the acoustic wave and to form an acoustic signal representative of the detected acoustic wave, a quadrature demodulator configured to process the acoustic signal to produce a pair of demodulated signals, and a processor configured to analyze the demodulated signals to obtain the Doppler shift and the flow information thereby measuring the flow of light-absorbing particles having low ultrasonic contrast inside highly optically scattering media.

In another aspect, a method is provided for detecting a Doppler shift of an acoustic wave due to intensity-modulated continuous-wave photoacoustic generated by light-absorbing particles. The method includes illuminating the flowing particles to produce an acoustic wave, detecting the acoustic wave and forming an acoustic signal representative of the detected acoustic wave, processing the acoustic signal to produce a pair of demodulated signals, and analyzing the demodulated signals to obtain the Doppler shift and the flow information by measuring the flow of light-absorbing particles having low ultrasonic contrast inside highly optically scattering media.

BRIEF DESCRIPTION OF THE DRAWINGS

The embodiments described herein may be better understood by referring to the following description in conjunction with the accompanying drawings.

DETAILED DESCRIPTION

Figure 1:
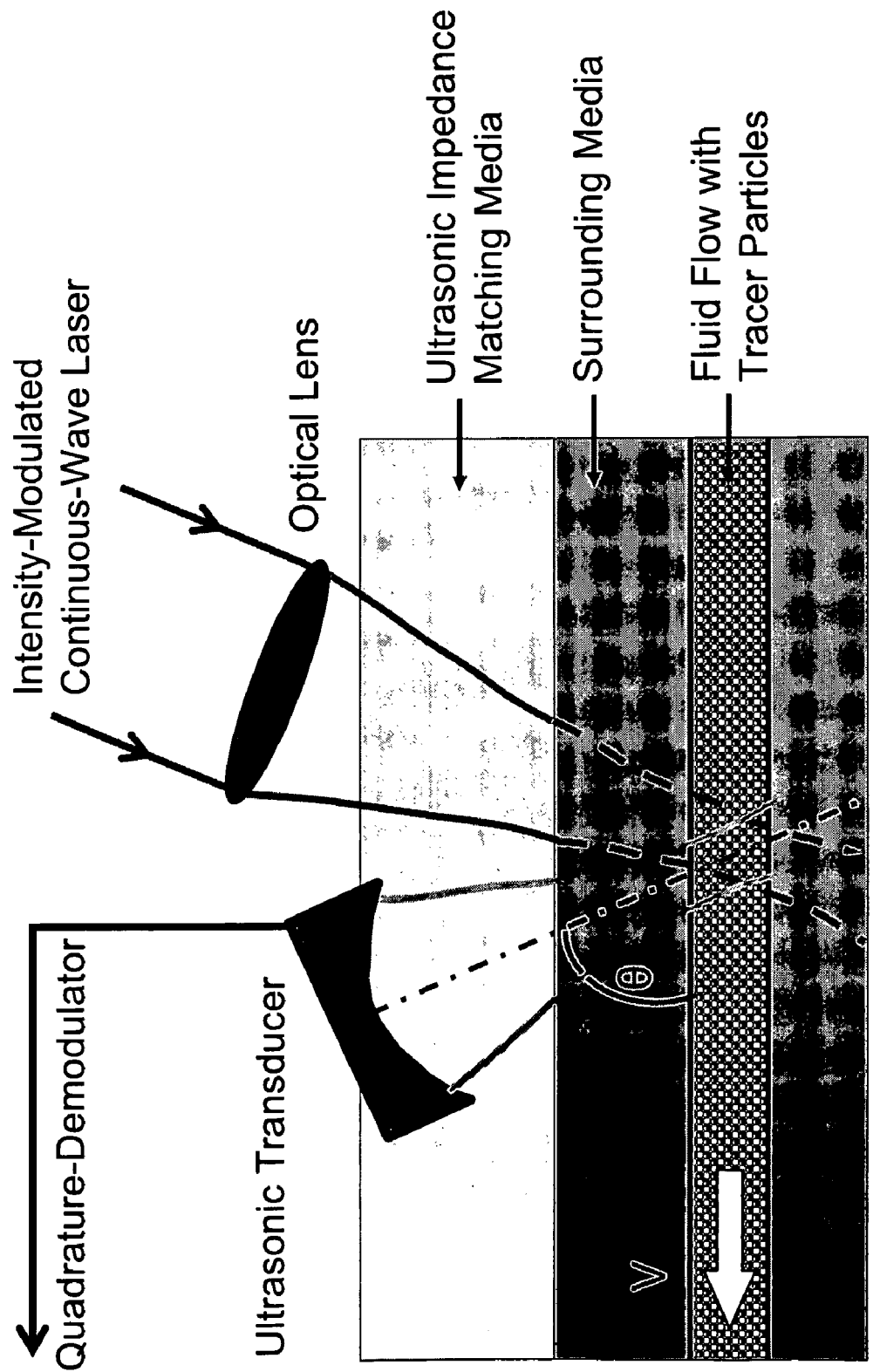
FIG. 1 is a diagram illustrating the geometry of photoacoustic Doppler flow measurements.

While the making and using of various embodiments of the invention are discussed in detail below, it should be appreciated that the embodiments of the invention provides many applicable inventive concepts that may be embodied in a wide variety of specific contexts. The specific embodiments discussed herein are merely illustrative of specific ways to make and use the invention and do not delimit the scope of the invention.

Terms defined herein have meanings as commonly understood by a person of ordinary skill in the areas relevant to the embodiments of the invention. Terms such as "a," "an" and "the" are not intended to refer to only a singular entity, but include the general class of which a specific example may be used for illustration. The terminology herein is used to describe specific embodiments of the invention, but their usage does not delimit the invention, except as outlined in the claims.

In some embodiments, the term "photoacoustics," or the related term "optoacoustics," refers to the generation of acoustic waves by modulated or pulsed optical radiation.

In some embodiments, the term "photoacoustic Doppler" refers to the combination of the photoacoustic effect and the Doppler effect. The photoacoustic effect generates an acoustic wave. The Doppler effect refers to the Doppler frequency shift of the acoustic wave due to moving light-absorbing particles. As described below with regards to some embodiments, the photoacoustic Doppler effect may be referred to the PAD effect.

Photoacoustic (PA) imaging is a hybrid technology that maps the internal distribution of optical energy deposition, such as specific absorption, in biological tissues by detecting laser-induced ultrasonic waves, which are also called photoacoustic or PA waves. PA imaging takes advantage of the weaker ultrasonic scattering, whose magnitude per unit path length is two orders of magnitude less than that of optical scattering, to combine ultrasonic resolution with optical contrast. PA imaging is able to extract certain physiological parameters for functional imaging by varying the optical wavelength of the excitation laser.

State-of-the-art PA techniques always use pulsed lasers as the PA excitation source. The major reasons for this choice include (1) high energy in each laser pulse—even if within the ANSI safety limit—yields strong PA signals, leading to a good signal-to-noise ratio; (2) PA transients provide axial resolution along the ultrasonic propagation direction; and (3) the difference in the time of flight of PA waves reduces signal cluttering. For example, the first dark-field confocal PA microscope (PAM) using pulsed laser illumination is capable of imaging biological tissue with an approximately 15 micrometer (μm) axial resolution, a lateral resolution between approximately 45 μm and approximately 120 μm, and an SNR of approximately 40 decibels (dB). Pulsed PA imaging techniques, however, suffer from laser jittering as well as acoustic and thermal noises within the wide bandwidth of the ultrasonic transducer. In addition, high-energy pulsed lasers are expensive and bulky, which limits the applications of PA imaging technologies in medicine and biology.

Continuous-wave (CW) PA excitation sources such as high-power laser diodes, which are inexpensive, compact, and durable, offer attractive alternatives. CW PA detection with a narrow-band ultrasonic transducer and a narrow-band or lock-in amplifier provides high sensitivity and strong noise rejection. CW PA microscopy based on lock-in detection has been demonstrated to measure surface and subsurface properties of solids. Although single-frequency detection does not enable unequivocal phase-based axial resolution owing to the $2\pi$ phase ambiguity, chirping or frequency sweeping over a bandwidth enables full axial resolution, which is comparable to the time-domain resolution acquired with the same bandwidth. However, single-frequency detection with a focused ultrasonic transducer may provide amplitude-based axial resolution as will be shown later. In addition, dual-frequency detection may be tailored to reject undesirable PA signals from a particular depth.

The underlying physical principle of this method is the photoacoustic Doppler effect from flowing small light-absorbing particles. The light-absorbing particles are used as tracer particles. When the particles are illuminated by an intensity-modulated continuous-wave laser beam, the particles will absorb the light, produce local heating, and create an acoustic wave due to thermoelastic expansion. Compared to known systems and methods that use scattering-based Doppler flowmetry, PAD-based flowmetry results in less background noise. Moreover, if there are no other absorbers besides the tracer particles inside the measured volume, the PAD signal comes only from the tracer particles themselves. PAD flowmetry may be used to quantify tissue blood flow noninvasively because red blood cells are dominate endogenous light-absorbing tracer particles that are capable of absorbing light approximately 100 times more than a background light level. In contrast, known systems and methods result in a scattering-based Doppler signal that includes an overwhelming background reflection from the flow's surrounding medium.

More specifically, because laser diodes produce peak powers several orders of magnitude less than Q-switched lasers, special attention should be paid to the SNR. As such, the peak PA pressure generated by light absorption is considered first. In the case of pulsed excitation, the light intensity may be approximated by a Gaussian function as shown in Equation (1)

$$I \approx E_P \frac{\omega_P}{\tau\sqrt{\pi}} \exp(-t^2/\tau^2) \qquad \text{Eq. (1)}$$

where $E_P$ is the optical fluence, and $\tau$ is the pulse width, wherein $\omega_P \approx 1/\tau$ is the cut-off frequency of the PA transient. In the case of intensity-modulated CW excitation, the light intensity is given by Equation (2) as follows $$I = I_{CW}[1 + \sin(\omega_C t)] \qquad \text{Eq. (2)}$$

where $I_{CW}$ is the time averaged light intensity and $\omega_C$ is the modulation frequency. If light intensity is expressed as shown by Equation (3) below $$I = I_0 f(\hat{t}) \qquad \text{Eq. (3)}$$

where $I_0$ denotes the maximum and $\hat{t}$ denotes a dimensionless time, wherein $\hat{t} = t/\tau$ or $\omega_C t$, the associated PA pressure is proportional to $df(\hat{t})/d\hat{t}$. Consequently, regardless of the absorber geometry, the maximum PA pressure due to pulsed excitation is given by Equation (4) as follows $$p_{P,max} \propto \sqrt{2/\pi e E_P \omega_P} \qquad \text{Eq. (4)}$$

whereas the PA pressure amplitude due to CW excitation is given by Equation (5) as follows $$p_{CW,max} \propto I_{CW} \qquad \text{Eq. (5)}$$

In both the pulse and CW modes, the maximum values of $E_P$ and $I_{CW}$ are limited by the ANSI safety standards. In the visible spectral region, the maximum $E_P$ is 20 millijoules per square centimeter (mJ/cm$^2$) and the maximum $I_{CW}$ is 200 milliwatts per square centimeter (mW/cm$^2$). To achieve comparable lateral resolution between the pulsed and CW modes, it is assumed that $\omega_P = \omega_C$. If $\omega_C/2\pi$ is set to approximately 2.45 megahertz (MHz), then $p_{P,max}$ is found to be approximately six orders of magnitude stronger than $p_{CW,max}$.

Such a difference in bandwidth between the two modes offsets the difference in signal strength because noise amplitude is proportional to the square root of the signal bandwidth. In pulsed mode, the cut-off frequency of the bandwidth is given by Equation (6) as follows $$\Delta f_P \propto \omega_P/2\pi \qquad \text{Eq. (6)}$$

and in CW mode, the bandwidth is only limited by the desired data acquisition rate of each pixel of the image. This difference in bandwidth increases the ratio of the SNR of the CW mode to that of the pulsed mode by approximately three orders of magnitude.

The difference in sensitivity between the ultrasonic transducers used in the two modes further offsets the difference in signal strength. In pulsed mode, the piezoelectric transducer, which must have a broad bandwidth, typically has an insertion loss of the order of 20 dB. This loss is due to either the low electromechanical coupling coefficient, K, of piezoelectric material or the high acoustic impedance, Z, because no piezoelectric material provides both high K and low Z. For example, polymers such as PVDF have a low Z but also a low K, whereas piezoceramics such as PZT have high K but also high Z. High Z ultrasonic transducers present strong acoustic impedance mismatch with soft biological tissue, which causes strong acoustic reflection at the interface. In CW mode, a low-loss resonant piezoelectric transducer may be used. When the thickness of the piezoelectric material equals one half of the acoustic wavelength, acoustic reflection at the interface in theory approaches zero. As a result, resonant transducers may be made of high K and high Z piezoceramic materials. In addition, resonant transducers do not need to use damping backing material, which is acoustically lossy. Therefore, a resonant transducer suffers from only electrical resistive loss and mechanical loss in the piezoelectric material. At a few megahertz frequency, these losses may be as little as a few dB. In the end, this difference translates into approximately another order of magnitude improvement in SNR for CW detection.

The difference in signal strength may also be offset by using higher intensity laser diodes that are modulated with low duty cycle tone bursts. According to ANSI standards for less than 10 seconds of exposure, the maximum permissible exposure is limited by $1100 t_e^{1/4}$ in $mJ/cm^2$, where $t_e$ denotes the exposure duration in seconds.

Altogether, the aforementioned three factors may offset the difference in signal strength between pulsed and CW modes by approximately five orders of magnitude. Therefore, a fully implemented CW system should provide a SNR about only one order of magnitude worse than that of a pulsed system.

A typical pulsed laser based PAM system is similar to the high-frequency version used in other known systems. A tunable dye laser pumped by an Nd:YAG laser serves as the PA excitation source. The pulsed system uses a 5-MHz spherically focused ultrasonic transducer made of composite material. The incident fluence on the sample surface and at the optical focus is less than 20 $mJ/cm^2$, which corresponds with the ANSI safety limit. To acquire an image, the PAM system records the PA wave at each location of the ultrasonic transducer and performs raster-scanning in the horizontal plane, i.e., the x-y plane, with a step size of approximately 125 μm.

FIG. 1 shows the principle of flow measurement using the present photoacoustic Doppler technique. Small light-absorbing particles in the flowing fluid serve as tracer particles. The laser beam from an intensity-modulated continuous-wave laser is focused on the flow. The acoustic signal is detected by a spherically focused ultrasonic transducer and relayed to a quadrature-demodulator. The flow is measured at an angle θ relative to the axis of the ultrasonic transducer. The measurement is taken from the overlapped area of the laser beam and the focal zone of the ultrasonic transducer. Since it is possible that the surrounding medium may be optically scattering (as in biological tissue), the laser beam can be multiple-scattered in the medium. The demodulated signals are analyzed spectrally to obtain the photoacoustic Doppler shift thus the flow speed.

Figure 2:
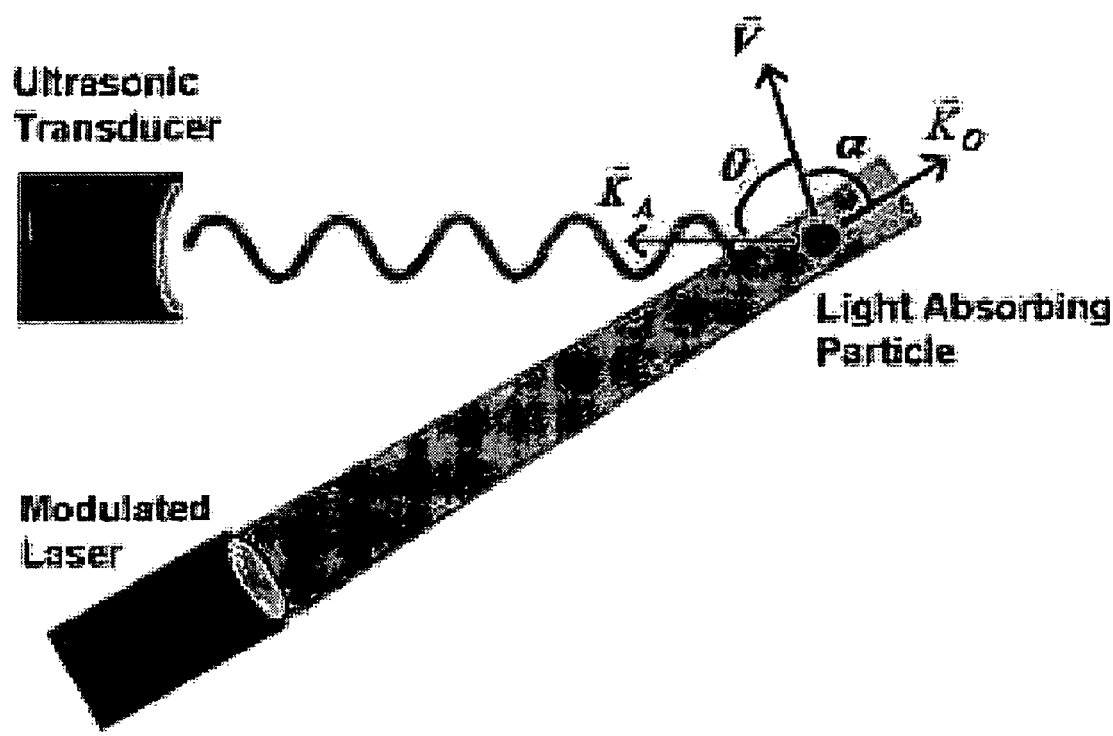
FIG. 2 is a schematic diagram illustrating a photoacoustic Doppler shift.

FIG. 2 is a schematic diagram illustrating photoacoustic Doppler shift, in which a small light-absorbing particle moving along velocity vector $\vec{V}$ is illuminated by modulated continuous-wave light. As shown in FIG. 2, and when considering the PAD shift from a flowing light-absorbing particle, the particle is suspended in a liquid and flows with the liquid along velocity vector $\vec{V}$. When the particle is illuminated by an amplitude-modulated continuous-wave laser beam, an acoustic wave is generated due to the photoacoustic effect, and the acoustic wave may be detected by an ultrasonic transducer. If the laser beam is modulated at frequency $f_O$ with approximately 100% modulation depth, its intensity I as a function of time t may be expressed using Equation (7) as $$I = I_0 \cdot [1 + \cos(2\pi f_0 t)]/2 \quad \text{Eq. (7)}$$

where $I_0$ denotes the peak intensity. Such a laser beam may be treated as a photon density wave with frequency $f_O$. If the particle is not in motion, the acoustic wave has the same frequency as $f_O$. Otherwise, the photoacoustic wave is subject to a Doppler shift.

Since the particles are moving, the acoustic wave will have a Doppler shift $f_{PAD}$, which can be expressed using Equation (8) as $$f_{PAD} = f_O \frac{V}{c_A} \cos\theta \equiv \frac{V}{\lambda_A} \cos\theta \quad \text{Eq. (8)}$$

where $f_O$ denotes the laser modulation frequency, V the speed of the moving particle, $c_A$ and $\lambda_A$ the speed and the wavelength of sound, respectively, and θ the detection angle. When the particles are used as the tracer in the flowing fluid, by measuring $f_{PAD}$, V can be extracted if the other parameters are known. If $f_{PAD}$ has a distribution, V will have a distribution as well. The distribution of V reflects the flow profile.

More specifically, because photoacoustic pressure amplitude is proportional to the absorbed optical power density, the Doppler shift depends on the frequency of the intensity $f_O$ instead of the frequency of the field. The Doppler shift should also depend on the flow velocity V and the flow direction angles α and θ as illustrated in FIG. 1, wherein $\vec{K}_O$ and $\vec{K}_A$ refer to the wave vectors of the photon density and acoustic waves, respectively. If V is much less than the sound speed, the Doppler shift may be expressed using Equation (9) as $$f_{PAD} = -f_O \frac{V}{c_O} \cos\alpha + f_O \frac{V}{c_A} \cos\theta \quad \text{Eq. (9)}$$

where $c_O$ and $c_A$ denote the speeds of light and sound, respectively, in the medium. In Eq. (4), the first term, $$-f_O \frac{V}{c_O} \cos\alpha,$$

represents the shift in the frequency of photon density wave "seen" by the particle as a moving receiver, and the second term, $$f_O \frac{V}{c_A} \cos\theta,$$

represents the shift in the frequency of the photoacoustic wave "observed" by the ultrasonic transducer, where the particle works as a moving source. Because $c_O/c_A \sim 10^5$ and $V \gg c_A$, usually only the second term is detectable. Therefore, the PAD shift may be represented using Equation (10) as follows $$f_{PAD} = f_O \frac{V}{c_A} \cos\theta \qquad \text{Eq. (10)}$$

This shift equals half of the shift in pulse-echo Doppler ultrasound and does not depend on the direction of the laser illumination. Unlike the laser Doppler effect, the PAD effect deals with a photon density wave instead of an optical wave and the photon density wave has a much longer wavelength than the acoustic wave. Therefore, the Doppler shift of the illumination laser is negligible.

Figure 3:
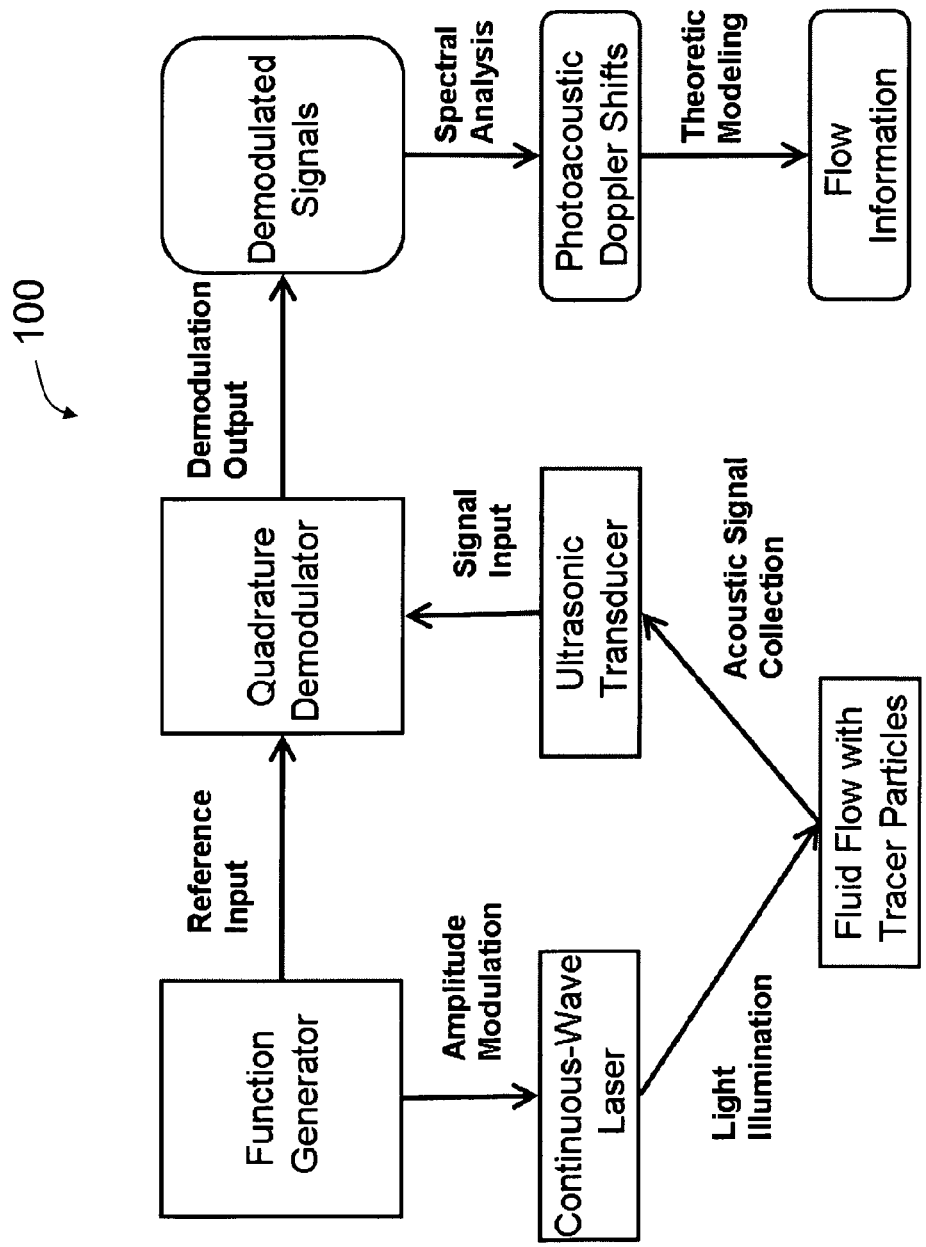
FIG. 3 is a functional block diagram of a photoacoustic Doppler flow measurement system.

A function diagram of the whole system 100 is shown in FIG. 3. A function generator provides a sine wave at frequency $f_O$ to modulate the laser intensity. The function generator also provides a synchronized signal at the same frequency $f_O$ as the reference input to the quadrature-demodulator, where the acoustic signal is transformed to a pair of demodulated signals. Spectral analysis of the demodulated signals yields the spectra of the photoacoustic Doppler shifts. Theoretical modeling based on Eq. (10) shows that flow information such as the average flow speed, flow profile, and flow direction can be extracted from the spectra.

Photoacoustic imaging capability may be added. In FIG. 1, the laser illumination and the acoustic detector may be scanned over the object to form a flow image. At the same time, an optical absorption image may be acquired as well.

In some embodiments, the current prototype operates in continuous-wave mode, where the depth information is lost. This problem may be overcome by operating in burst mode. As in pulsed ultrasound Doppler imaging, a few cycles of modulated laser beam in a burst will produce the same number of cycles of photoacoustic wave. Time-resolved detection of the photoacoustic wave provides depth information. Spectral analysis of the burst yields flow information.

Figure 4:
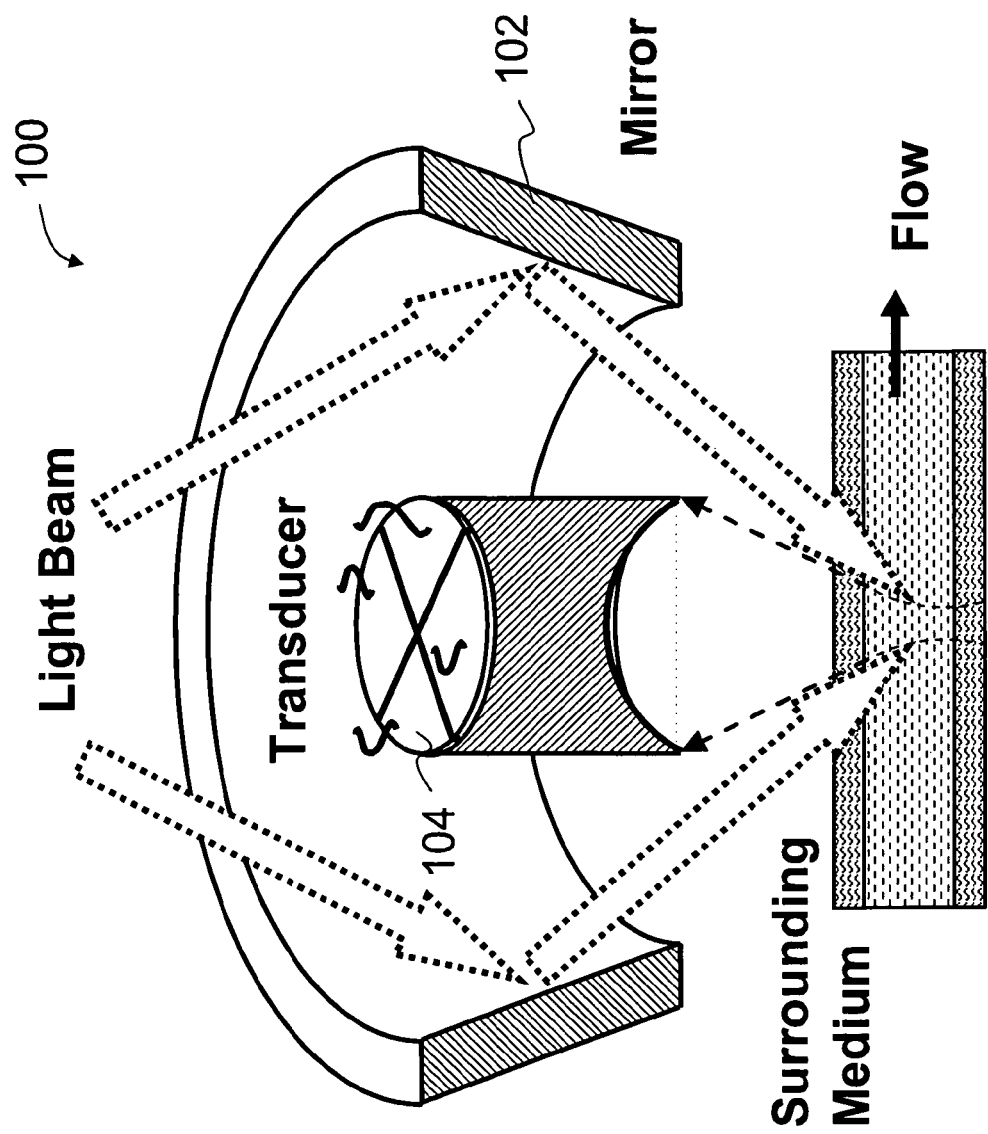
FIG. 4 is a diagram of an alternative embodiment of a photoacoustic Doppler flow measurement system.

FIG. 4 shows a simplified schematic of the differential photoacoustic Doppler system 100 (shown in FIG. 3). In this setup, light is delivered by a mirror 102 or lens assembly to the point of measurement, which coincides with the focal point of the multi-element spherically focused ultrasonic transducer 104. The ultrasonic transducer 104 can be either a solid spherical transducer divided into four active elements in four quadrants or four separate focused transducers in a confocal arrangement with all focusing on the same point. By separately measuring the differential signals from each opposing pair of the four active elements, a projection of the flow velocity on the two orthogonal directions can be measured. This embodiment can simultaneously measure flow speed and direction.

System 100 uses light-absorbing tracer particles thus is absorption based, whereas other Doppler techniques use scattering tracer particles thus are scattering based. Consequently, photoacoustic Doppler sensing and imaging has high contrast in, for example, blood flow measurement because hemoglobin in blood vessels provides strong optical absorption whereas the surrounding medium outside the blood vessels has weak optical absorption. Scattering based Doppler techniques usually suffer from much weaker backscattering signals mixed with strong reflection signals from the flow boundary, where the former is needed to extract flow information.

Moreover, system 100 uses the photon density wave instead of the optical wave to provide the frequency and energy to excite the acoustic wave. Consequently, in the case of measuring flow in an optically scattering medium such as biological tissue, photoacoustic Doppler sensing and imaging penetrates deeper than the laser Doppler and optical Doppler counterparts. The photoacoustic Doppler technology potentially penetrates one centimeter in biological tissue, whereas the laser Doppler and optical Doppler counterparts can penetrate only about one millimeter. System 100 depends on photon density delivery and acoustic wave detection. As a result, the flow directional information is preserved even in highly optically scattering media such as biological tissue. Embodiments of the invention detect relatively low-speed blood flow.

Figure 5:
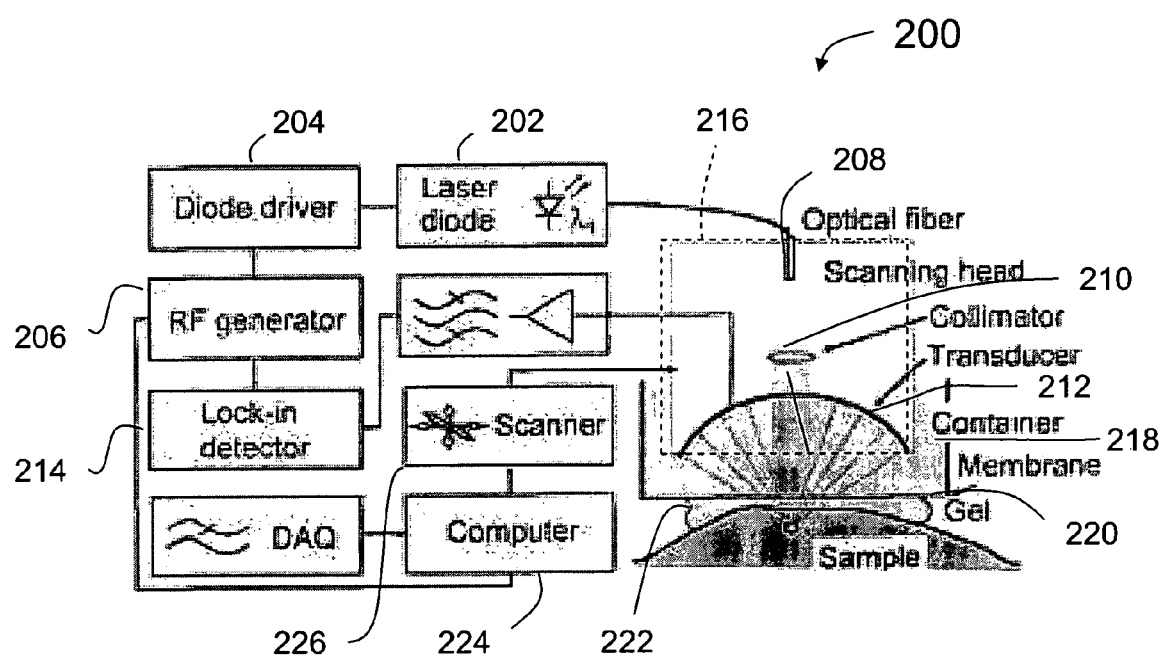
FIG. 5 is a diagram of a continuous-wave (CW) photoacoustic Doppler flow measurement system.

FIG. 5 shows a diagram of an embodiment of a CW PA imaging system 200 that uses a scanning system similar to that used by a pulse PAM system but with different optical excitation and data acquisition systems. An inexpensive, compact, and durable laser diode 202 driven by a laser diode current controller 204 is the excitation source. The power of the laser diode 202 is modulated at approximately 2.45 MHz with a 100% modulation depth by applying a 10 V sinusoidal signal from a function generator 206 to the laser bias through a serial 50-Ohm resistor. Light from the laser diode 202 is delivered via an optical fiber 208. The transmitted light passes to the sample through a 5 mm diameter optical collimating lens 210 secured within the hole on the axis of the transducer. The resulting time averaged spatial peak optical power density on the sample surface after loss in the light delivery system is within the ANSI safety limit of 200 mW/cm$^2$. An ultrasonic transducer 212 has a bowl-shaped piezoceramic active element with an approximately 38-mm diameter and an approximately 22-mm radius of curvature. The through-thickness resonance frequency of transducer 212 is approximately 2.45 MHz. Gold electrodes are deposited on the two spherical surfaces of the active element. The electrode on the concave spherical surface is soldered to the transducer shell with a low melting point alloy, and the other electrode is connected to a resonant preamplifier via an impedance matching line transformer. The preamplified PA signal is detected by a lock-in amplifier 214, which is used as both a phase-sensitive detector and a data acquisition system. The components within the dashed box 216 in FIG. 5 are translated within a container 218 with an immersion liquid, such as water. A window at the bottom of the water container 218 is sealed with an optically and ultrasonically transparent polyethylene membrane 220. During data acquisition, a sample is placed below the membrane and acoustically coupled with commercial ultrasound gel 222. The amplitude and phase of the signal are analyzed by a computer 224, which also controls the mechanical scanner 226.

During operation of system 200, the lower bound of the SNR is estimated by imaging an edge of a highly optically absorptive black polyethylene film in water. The image contrast may be considered the lower bound of the SNR.

Figure 6:
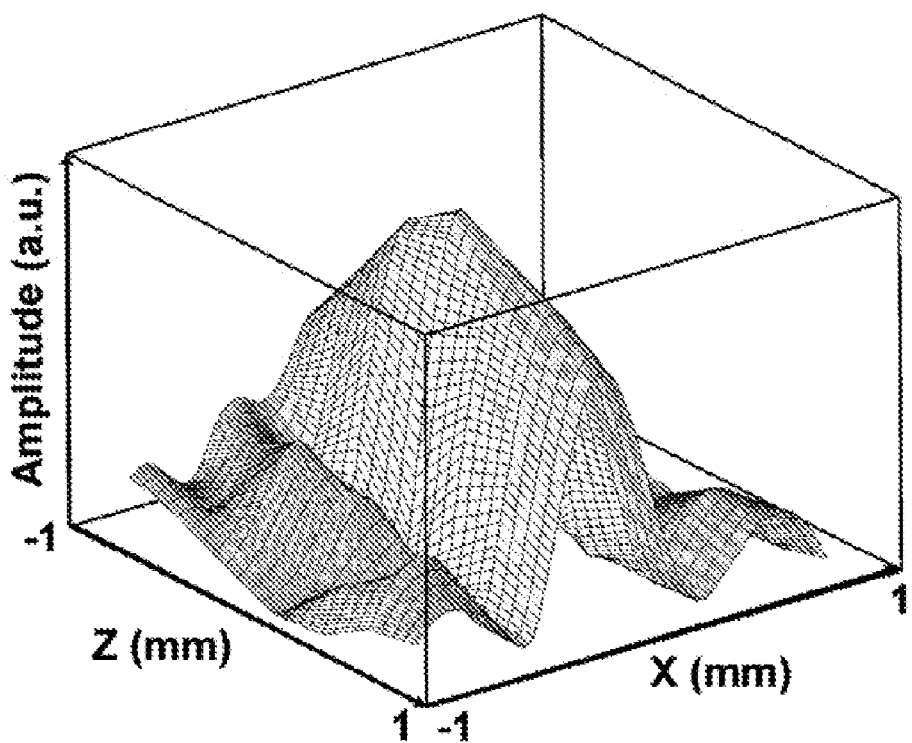
FIG. 6 is a diagram illustrating a line spread function of the CW photoacoustic Doppler system shown in FIG. 5.

The lateral resolution of system 200 may be tested by imaging a 60-μm diameter human hair immersed in a 0.2% lipid solution. The hair is oriented along the Y axis, which is normal to the transducer axis, i.e., the Z axis. The PA signal amplitude is plotted as a function of the Z and X axes, as shown in FIG. 6, which is referred to as the line spread function. The pressure sensitivity distribution may then be computed using Equation (11) as follows $$P(u)=P_0(\sin(u/4)/(u/4)) \qquad \text{Eq. (11)}$$

where $P_0$ is the peak pressure sensitivity and $$u = \frac{2\pi Z}{\lambda}(NA)^2.$$

Figure 7:
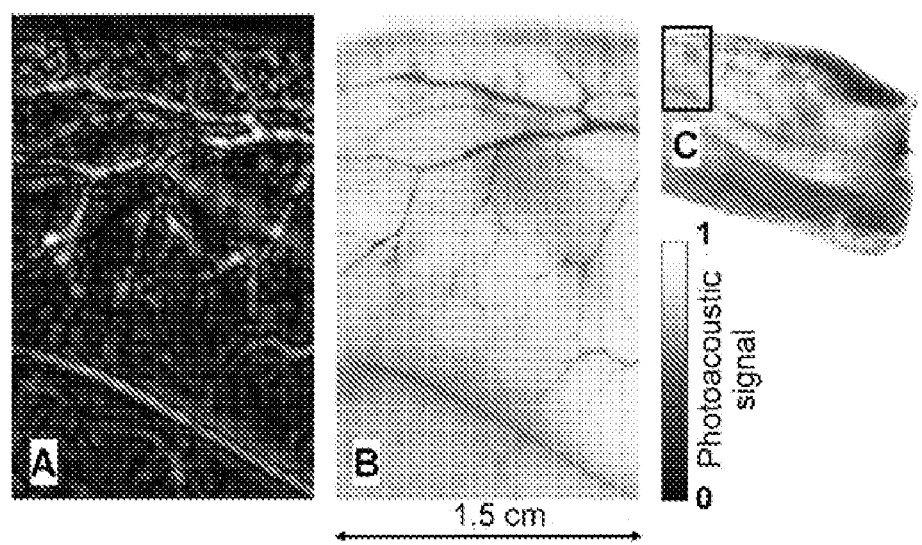
FIG. 7(a) is an image of a rabbit ear vasculature obtained using the CW photoacoustic Doppler system shown in FIG. 5.
FIG. 7(b) is a photograph of the imaged area; and 7(c) is a photograph of the entire rabbit ear.

FIGS. 7(a), 7(b), and 7(c) illustrate the feasibility of CW PA imaging for biomedical applications. More specifically, FIG. 7(a) shows an amplitude image—a plot of the PA signal amplitude versus the scanned positions of the ultrasonic transducer—of a rabbit ear. The scanning step size is approximately 150 μm in both the X and Y directions. Raster scanning was performed with a scanning speed of 10 steps, i.e., pixels, per second, whereas the integration time of the lock-in amplifier was approximately 30 ms. The rabbit ear was then trans-illuminated for photography of the vasculature, as shown in FIGS. 7(b) and 7(c). The major arteries and veins were located between the central layer of cartilage and the dorsal skin. The skin overlying the imaged vasculature measured an average thickness of approximately 300 μm. FIG. 7(b) shows a close-up of the vascular anatomy within the PA scanning area, which displays small branches from the central auricular branch and tributaries from the rostral auricular vein. The smallest visualized vessel by the CW PA imaging system in this specific region of the ear has a diameter of approximately 200 μm, estimated from the photograph. There is a good correspondence between the PA image and the photograph although some artifacts are apparent. The artifacts are probably due to the interference between PA signals originating from different locations. In addition, ultrasonic reflections from the sample boundaries and the transducer surface as well as leakage of the laser-modulation electrical signal into the lock-in amplifier may also cause artifacts.

Based on a Fourier transform, the CW mode with the modulation frequency swept over a bandwidth is equivalent to the pulsed mode with the same bandwidth. Therefore, the PA sources may be localized by sweeping the modulation frequency within the frequency band of the ultrasonic transducer. In the frequency domain, the transducer output voltage, $V(\omega)$, as a function of frequency, $\omega$, is proportional to the PA pressure, $p(\omega)$, multiplied by both the frequency response of the ultrasonic receiver and the phase shift due to the PA wave propagation distance $z_0$ from the PA source to the ultrasonic transducer. The frequency-dependent ultrasonic attenuation in the medium may be included as well. In one embodiment, system 200 includes only a signal small-sized PA source although the same principle applies to a distribution of PA sources. If the frequency response of the resonant transducer is assumed to have a Gaussian shape the voltage output may be determined according to Equation (12) as follows $$V(\omega) \propto p(\omega) \cdot \exp(-(\omega-\omega_0)^2/(\Delta\omega)^2) \cdot \exp(i\omega z_0/c). \qquad \text{Eq (12)}$$

By virtue of the Fourier transformation and the relation $z=ct$, Eq. (12) may be converted into the space domain as shown by Equation (13)

$$V(z) \propto p(z) \otimes \exp\left(-\left[\pi \frac{(z-z_0)}{\lambda} \frac{\Delta\omega}{\omega_0}\right]^2\right), \qquad \text{Eq. (13)}$$

where $\lambda$ denotes the wavelength of the PA wave at frequency $\omega$ and $\otimes$ denotes a convolution operation. The PA source is localized with a resolution related to the ultrasonic wavelength multiplied by a factor of $\omega_0/\pi\Delta\omega$. The resolution may be related to the pulse width in the time domain multiplied by the speed of sound. In practice, the system frequency response may be measured by recording the amplitude and phase of the transducer output in response to a small test target placed at the focal spot of the transducer, and the continuous Fourier transformation may be implemented in its discrete form. Since $\Delta\omega \ll \omega_0$ for a resonant transducer, frequency sweeping is not broad enough to achieve high spatial resolution. If a broad-band transducer is used instead, the sensitivity is reduced.

Figure 8:
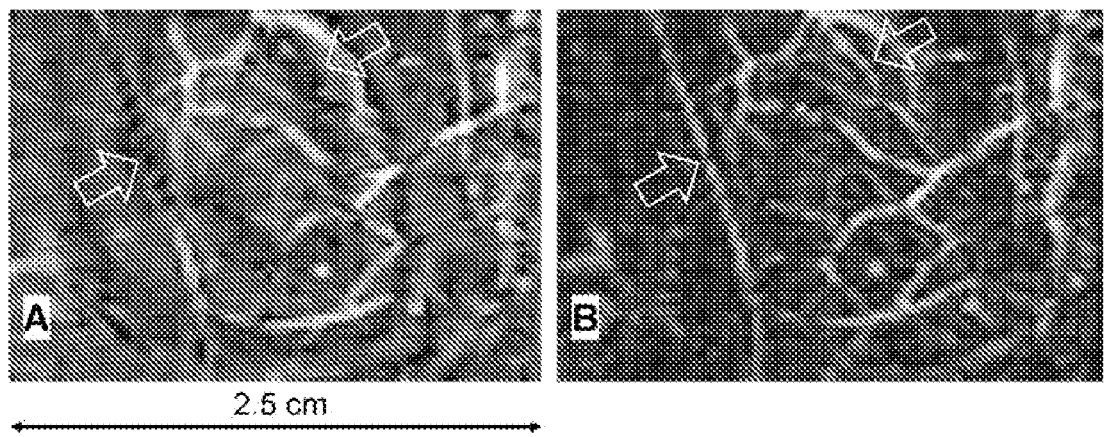
FIGS. 8(a) and 8(b) are amplitude images of a rabbit ear vasculature obtained using the CW photoacoustic Doppler system shown in FIG. 5.

In some cases, a few frequencies are sufficient to remove some of the most significant imaging artifacts. Some interference artifacts are indicated by arrows in FIG. 8(a). Here, it is assumed that the interference is between the PA signals from blood vessels and the front surface of the transducer. Two frequencies shifted by $\Delta f=c/2z_0$ were used and the two transducer outputs were subtracted. The difference image is shown in FIG. 8(b). As shown, this simply procedure significantly improves the image quality. For example, some blood vessels that show lengthwise contrast inversion in FIG. 8(a), as indicated by arrows, become uniformly bright in FIG. 8(b).

Figure 9:
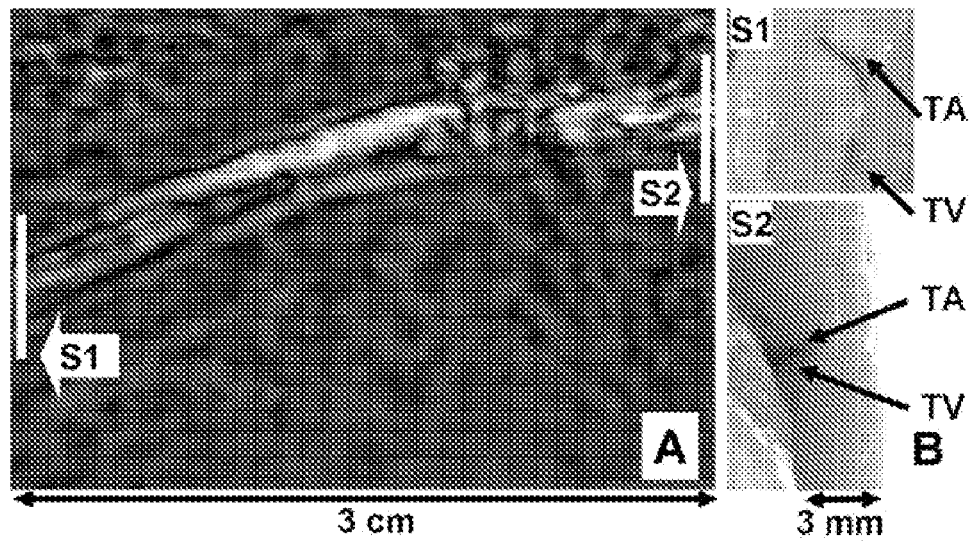
FIG. 9(a) is an amplitude image of a rabbit tibial artery and a tibial vein obtained using the CW photoacoustic Doppler system show in FIG. 5.
FIG. 9(b) is a photograph of each of two anatomical cross-sections in FIG. 9(a) through the leg muscle.

To demonstrate the capability of system 200 to image relatively deep structures, a rabbit leg has been imaged using system 200 shown in FIG. 5 to produce the image shown by FIG. 9(a). Two anatomical cross-sections were photographed for comparison as shown in FIG. 9(b). The bright structures shown in FIG. 9(a) are the tibial artery and the tibial vein. The diameters of the tibial artery and vein are both approximately 1 mm as estimated by optical microscopy. The scanning area covers an approximately 30 mm×20 mm area through 240 and 160 scanning steps in the X and Y directions, respectively. As revealed by FIG. 9(b), the main branches of both the tibial artery and tibial vein seat below a 2.4 mm to 3.4 mm thick layer of skin and muscle tissue.

The current CW system has a relative long data acquisition time. If the data acquisition time per pixel is approximately 90 ms, the scan time for a 10,000-pixel two-dimensional en face image using the current CW system may be as long as 15 minutes. If only a 100-pixel one-dimensional image is needed, the acquisition time is shortened to approximately 9 seconds. Use of an ultrasound array may potentially speed up the data acquisition.

If depth resolution is not important in a particular application, CW imaging may serve as a viable alternative to pulsed mode imaging. Like pulsed PA imaging, CW imaging may provide functional information of biological tissue as well if multiple laser diodes of different wavelengths are used for spectral measurements. Possible applications of the CW technique may include, for example, sentinel lymph node mapping and cerebral blood oxygenation monitoring.

Figure 10:
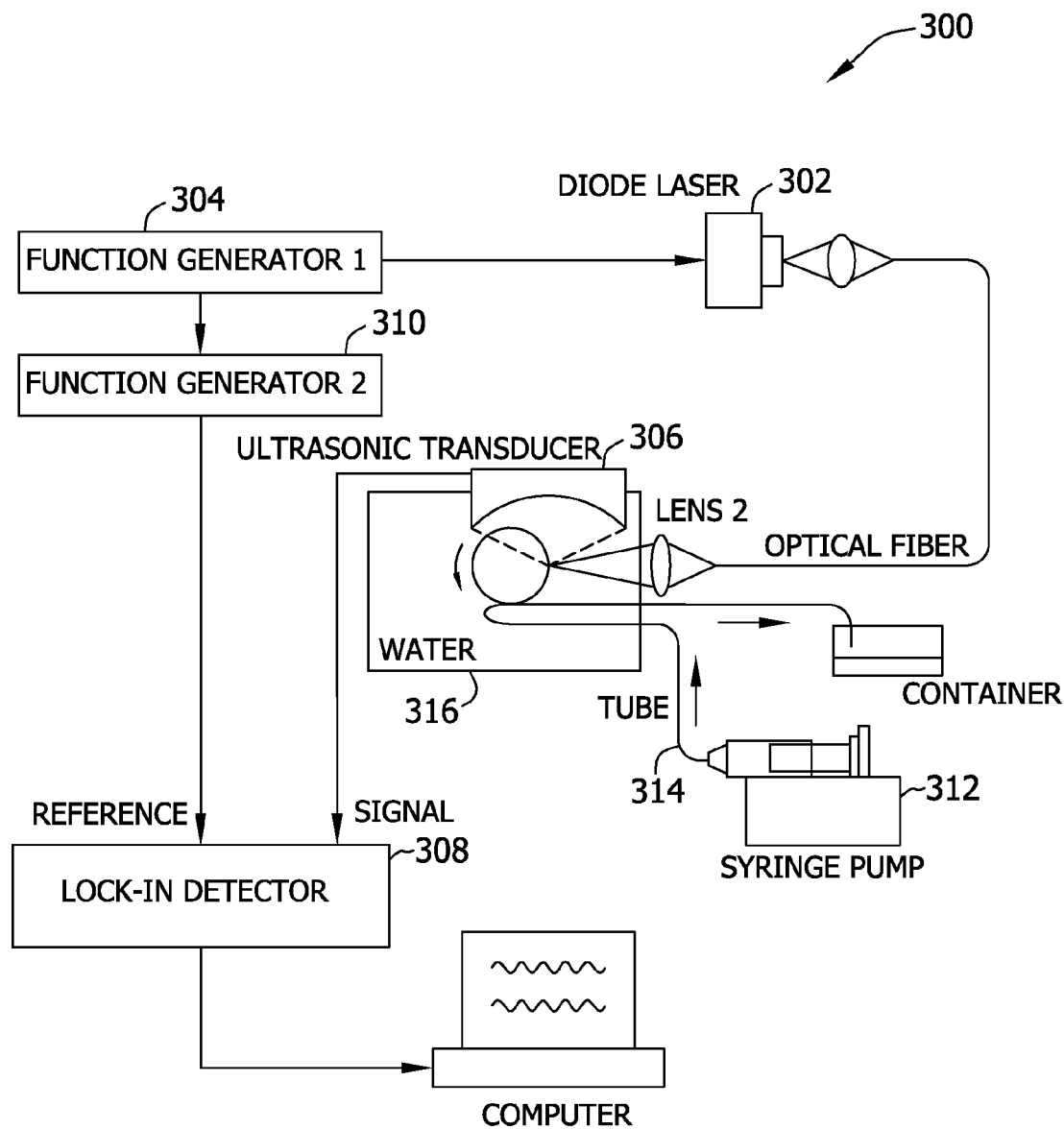
FIG. 10 is a diagram of an experimental setup for testing continuous-wave photoacoustic Doppler flow measurement.

FIG. 10 shows an alternative system 300 that is based on continuous-wave (cw) photoacoustic microscopy. A cw diode laser 302 is amplitude-modulated by a first function generator 304 with approximately 100% modulation depth at a frequency $f_O$. In one embodiment, $f_O$ is approximately 2.4550 Megahertz (MHz). The laser beam is focused onto the flow sample. A narrow-band piezoelectric transducer 306 is aligned to be confocal with the laser focal spot. The acoustic signal detected by transducer 306 is amplified by a narrow-band preamplifier and relayed to a signal input of a lock-in detector 308. A second function generator 310 is synchronized with first function generator 304 to provide a reference input for lock-in detector 308 with frequency $f_{Ref}=f_O$. Lock-in detector 308 uses phase sensitive detection to produce a pair of quadrature-demodulated outputs "X" and "Y." where "X" is the low-pass filtered product of the signal and the reference and "Y" is the low-pas filtered product of the signal the −90° phase shifted reference. In one embodiment, the bandwidth of the low-pass filter is determined by the time constant and is approximately 102 Hz. In one embodiment, lock-in detector 308 works at the maximum sampling rate of approximately 512 Hz with a total sampling points of approximately 15,360. The digitized "X" and "Y" are transferred to a computer and analyzed spectrally. The frequency difference between the signal and the reference is the Doppler shift of the signal.

As shown in FIG. 10, the fluid flow is generated by a syringe pump 312 coupled to a syringe by a tube 314. Tube 314 is formed in to a circle and mechanically fixed inside a water tank 316. A vertical sample of the circle measures at downstream distance of approximately 50 centimeters (cm) from the flow entry connected to the syringe. Through syringe pump 312, the volume flow rate, Q, may be manually set from approximately 0.04 cubic centimeters per hour (cc/hr) to approximately 39.6 cc/hr with steps of approximately 0.04 cc/hr. The flow sample is a particle suspension with a volume fraction $\phi \approx 15\%$, where the particle diameters distributed between approximately 2 micrometers (μm) and approximately 12 μm. The solution for suspending the particles is made by dissolving an appropriate amount of solid sodium polytungstate into distilled water so that its mass density is approximately 1.46 g/cm$^3$, which matches that of the particles. Additionally, a 1% volume of Tween-20 is added to the solution in order to reduce particle aggregation. The absorption coefficient of the suspension is estimated to be approximately 1.0 mm$^{-1}$ by a transmission measurement using the same diode laser.

Figure 11:
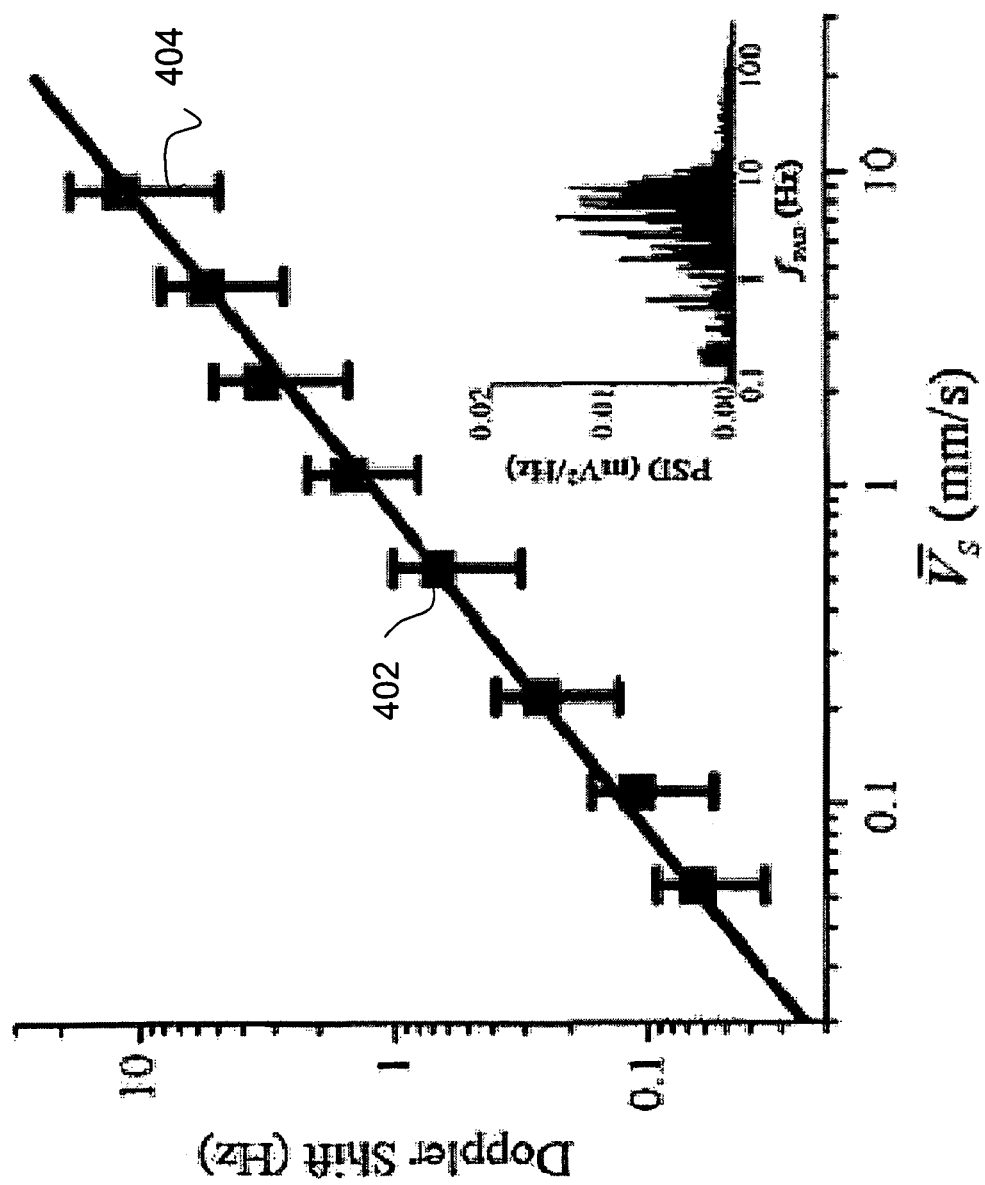
FIG. 11 is a graph illustrating an experimentally measured photoacoustic Doppler frequency shift as a function of average flow velocity.

During operation, the flow direction is set toward transducer 306. FIG. 11 shows a plot that illustrates the shifts versus the average flow velocity $\overline{V}_S$, which is calculated by dividing Q by the cross sectional area of the tube. The square symbols 402 indicate mean Doppler shifts, and the error bars 404 indicate the standard deviations, both of which may be calculated from the measured Doppler power spectra. For example, if the power spectrum for $\overline{V}_S$=4.4 mm/s is plotted as an inset in FIG. 11. The mean shift is then predicted by Equation (10), i.e., $$f_O \frac{\overline{V}_S}{c_A} \left( \frac{\cos 0° + \cos 60°}{2} \right),$$

where $c_A$ is approximately 1500 mm/s, and 0° and 60° represent the detection angular range of the ultrasonic transducer due to its numerical aperture. As can be seen, the measured mean Doppler shifts agree well with the theoretical predictions, whereas each standard deviation is about half of the associated mean shift.

The observed standard deviations were modeled by taking into account the flow velocity profile, the flow angular distribution, and the transit time of each particle through the detection volume. It was found that a parabolic velocity profile led to standard deviations greater than the mean shifts, whereas a fully blunted velocity profile (i.e., zero at the tube boundary and constant elsewhere) provided better agreement with the experimental observation. Such a finding suggests that the actual flow was blunted. Previous studies dealing with a similar type of flow also demonstrate that the velocity profile deviates from parabola and blunts to a shape that depends on parameters such as the particle volume concentration, particle size, flow channel size, flow speed, and/or downstream distance.

Also shown in FIG. 11, the measurable $\overline{V}_S$ is in the range between approximately 0.055 mm/s and approximately 8.8 mm/s. The maximum measurable $\overline{V}_S$ is limited by the signal-to-noise ratio When $\overline{V}_S$ increased, the power spectrum broadens linearly with $\overline{V}_S$. At the same time, the spectral amplitude decreases and eventually approaches the noise level. Increasing the laser power or improving the transducer sensitivity may extend the maximum. In contrast, the minimum measurable $\overline{V}_S$, which represents the velocity sensitivity of the system, was limited by the frequency resolution of the system. Increasing the number of sampling points may improve the minimum. The theoretical limit of the velocity sensitivity, which is based on the PAD broadening due to the Brownian motion of tracer particles, is $$\frac{2\pi f_O}{c_A} \cdot \frac{k_B T}{6\pi \eta a} \approx 3.0 \times 10^{-7} \text{mm/s},$$

where the Boltzmann constant $k_B$=1.38×10$^{-23}$ J/K, temperature T=300 K, viscosity coefficient $\eta$=10$^{-3}$ Pa·s, and the average particle radius $\alpha$=7 μm.

Figure 12:
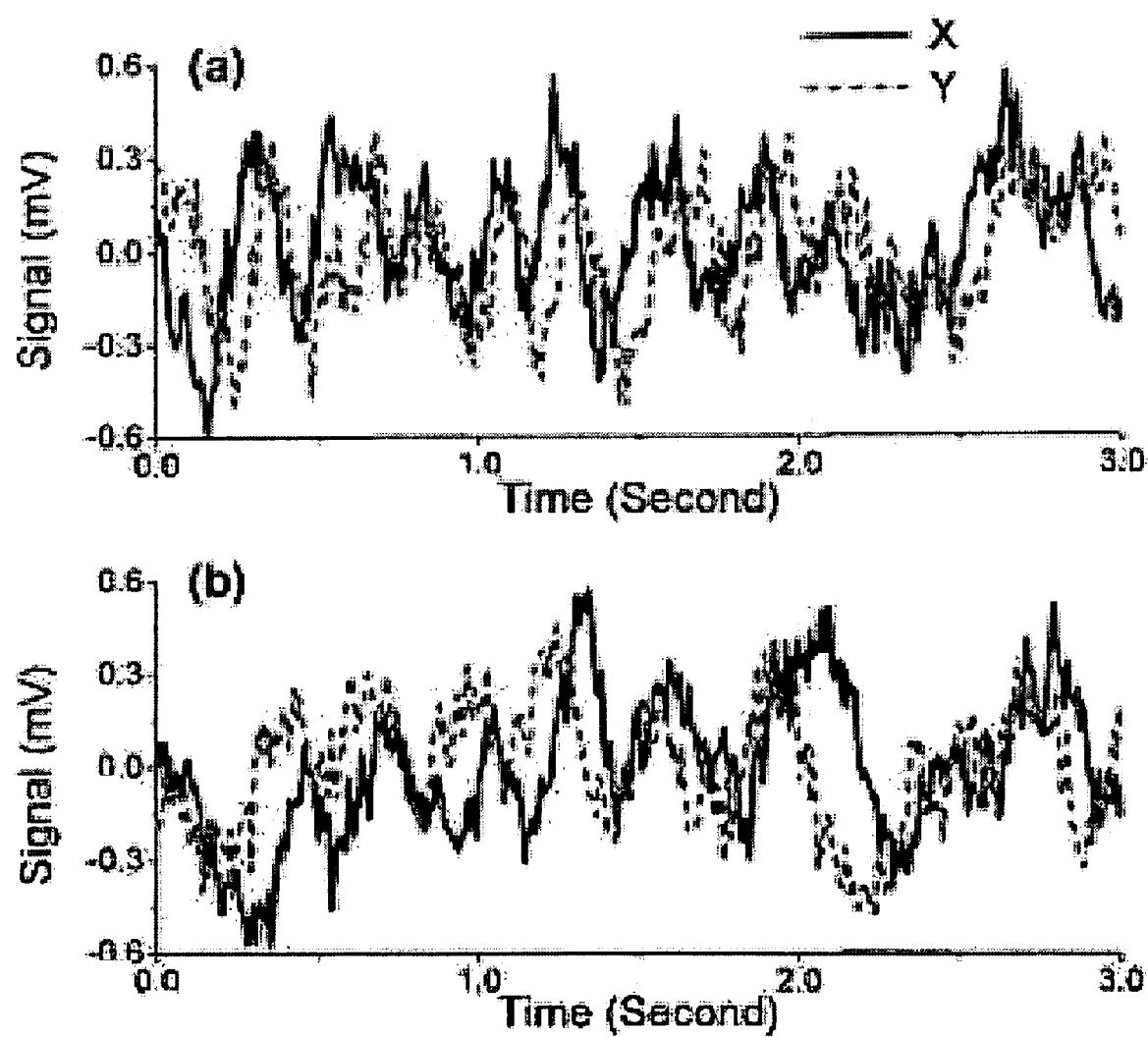
FIGS. 12(a) and 12(b) are graphs illustrating directional discrimination of flow in photoacoustic Doppler signals.

The dependence of the PAD shift on the flow direction may then be determined. First, the flow direction is reversed by simply switching two ends of the tube. FIGS. 12(a) and 12(b) plot the AC components of the "X" and the "Y" signals in a small time window for two flows with the same $\overline{V}_S$ of approximately 2.20 mm/s but in opposite directions. For clarity, the DC offsets, which are different for "X" and "Y" have been removed. As can be seen, the AC components of "X" and "Y" are similar in amplitude but different in phase with a shift of $\pi$/2. However, "Y" lags "X" in FIG. 12(a), whereas "Y" leads "X" in FIG. 12(b).

Such an observation may be understood from the following simplified model. It is assumed that the Doppler shift is infinitely narrow and takes on the experimentally observed mean frequency $\overline{f}_{PAD}$. The "X" and "Y" signals, representing the photoacoustic signals that are quadrature-demodulated by the lock-in detector, may be expressed using Equation (14) and (15) as follows $$X = A_O \cos \psi_O + \overline{A}_D \cos(2\pi \overline{f}_{PAD} t + \psi_D) + E_X \quad \text{Eq. (14)}$$

$$Y = A_O \cos(\psi_O - \pi/2) + \overline{A}_D \cos(2\pi \overline{f}_{PAD} t + \psi_D - \pi/2) + E_Y \quad \text{Eq (15)}$$

Here, $A_O$ and $\psi_O$ denote the amplitude and initial phase, respectively, of the unshifted photoacoustic signal; $\overline{A}_D$ and $\psi_D$ denote the amplitude and initial phase, respectively, of the PAD-shifted photoacoustic signal; and $E_X$ and $E_Y$ denote the noises. The DC components in both "X" and "Y" should come from the particles near the tube wall that have zero flow velocity because photoacoustic signals come from only the particles. The two AC components are due to the PAD shift and have a phase different of $\pi$/2. For the flow measurement shown in FIG. 12(a), $\overline{f}_{PAD}$ is positive; thus, "Y" lags "X." On the contrary, for the measurement shown in FIG. 12(b), $\overline{f}_{PAD}$ is negative; thus, "Y" leads "X." In addition, the DC components in "X" and "Y" may take on different values, whereas the AC components share the same amplitude.

Figure 13:
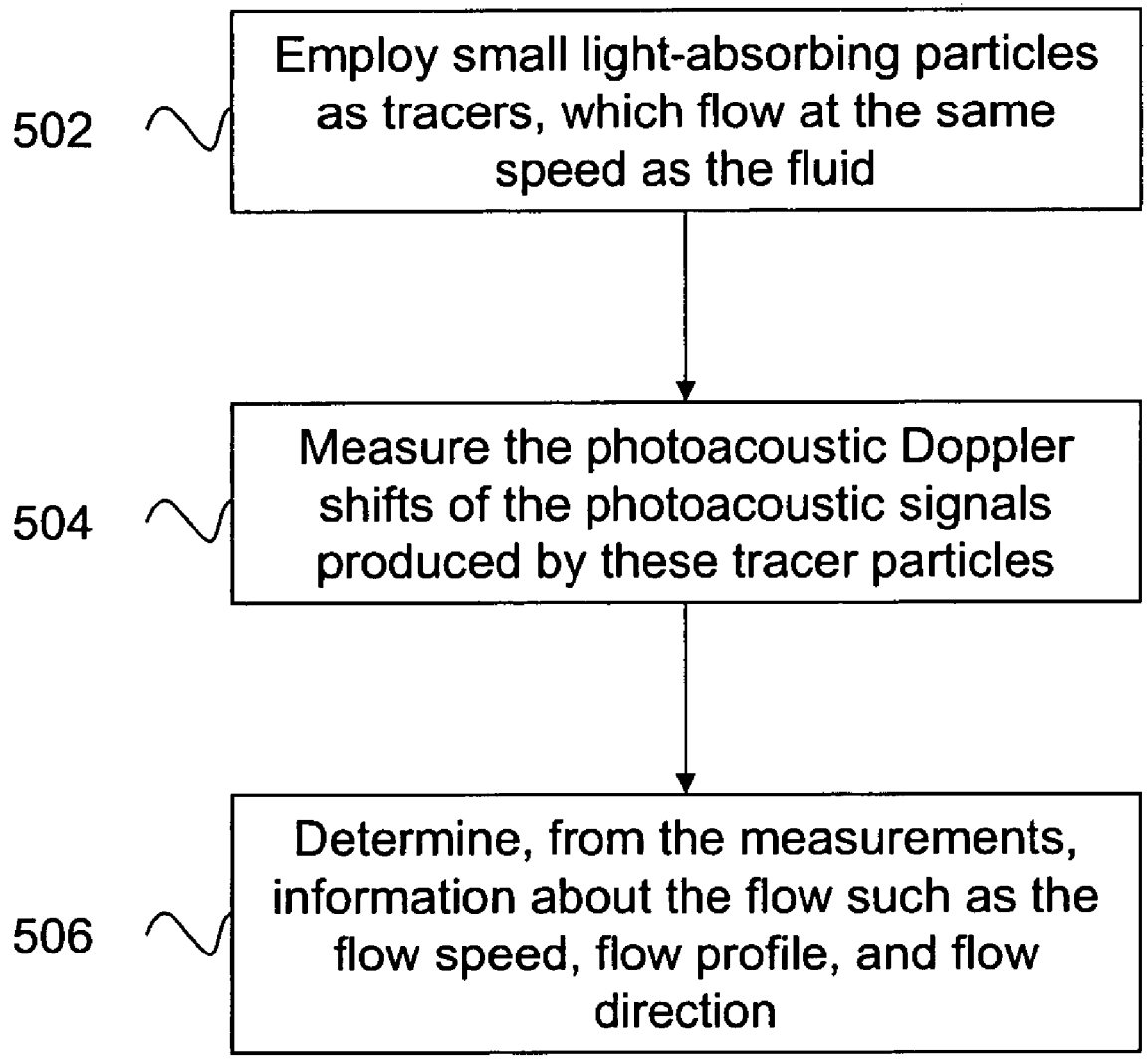
FIG. 13 is a flowchart illustrating a method for measuring a fluid flow.

FIG. 13 is a flowchart illustrating an exemplary method for measuring a fluid flow using a system such as those described herein. The method includes employing 502 small light-absorbing particles as tracers, which flow at the same speed as the fluid. The method also includes measuring 504 the photoacoustic Doppler shifts (or the photoacoustic Doppler spectra) of the photoacoustic signals produced by these tracer particles. In addition, the method includes determining 506, from the measurements, information about the flow such as the flow speed, flow profile, and flow direction.

The technique described herein has the unique capability to measure flow of light-absorbing particles having low ultrasonic contrast inside highly optically scattering media. The best example is measuring blood flow in small blood vessels. The photoacoustic Doppler technology can potentially be used to measure microcirculations because of its high sensitivity to flow. There is a demand for this information in biomedical studies such as cancer research, brain function studies, and clinical diagnosis of microcirculation in diabetic foot. It can also be used for measuring flow where the conventional Doppler techniques have difficulties. For example, when the reflection from the boundary is too high, the detection dynamic range may not be enough to acquire useful Doppler signals in other technologies.

Embodiments of the invention may be used to measure low-speed flow in a small channel. More specifically, embodiments of the invention may be used to measure blood flow in microcirculation, which has average velocities from a fraction of a millimeter per second in capillaries to tens of millimeters per second in small veins and arterials. The PAD flowmetry measures this type of blood flow at tissue depths beyond a few millimeters with preserved directional information, which is a challenge with existing flowmetry techniques. Acoustic flowmetry has difficulty measuring slow blood flow because tissue background scattering, also known as clutter noise, swamps the Doppler signal at low frequency. The PAD flowmetry has intrinsically low background and, therefore, has much less clutter noise. Although laser flowmetry and low-coherence optical Doppler tomography may measure microcirculation using a short optical wavelength, the flow directional information may get lost and the detection depth is limited to about 1 millimeter because of multiple light scattering in tissue. The PAD flowmetry is less hindered by multiple light scattering not only because the PAD shift does not involve the direction of laser illumination but also because photoacoustic imaging has demonstrated a greater imaging depth in tissue.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for detecting the Doppler shift of an acoustic wave due to intensity-modulated continuous-wave photoacoustic generation from light-absorbing particles, said system comprising:
    a continuous-wave laser configured to emit an intensity-modulated beam within the same laser that illuminates the flowing particles such that the flowing particles produce an acoustic wave;
    an ultrasonic transducer configured to detect the acoustic wave and to form an acoustic signal representative of the detected acoustic wave;
    a quadrature demodulator configured to process the acoustic signal to produce a pair of demodulated signals; and
    a processor configured to analyze the demodulated signals to obtain the Doppler shift and the flow information to facilitate measuring the flow of light-absorbing particles having low ultrasonic contrast inside highly optically scattering media.

2. The system of claim 1, wherein the light-absorbing particles are contained within a fluid and flow at the same speed as the fluid.

3. The system of claim 1, wherein the pair of demodulated signals include a first signal that is a low-pass filtered product of the acoustic signal and a reference signal and a second signal that is a low-pass filtered product of the acoustic signal and the reference signal after being phase shifted.

4. The system of claim 1, wherein said ultrasonic transducer comprises a piezoceramic transducer.

5. The system of claim 1, wherein said laser comprises a laser diode.

6. The system of claim 1, further comprising an optical fiber configured to deliver the light to an examined area via an optical collimating lens configured to focus the light on the examined area.

7. The system of claim 1, wherein said laser is configured to perform frequency sweeping over a predetermined bandwidth to facilitate obtaining axial resolution comparable to a time-domain resolution acquired with the predetermined bandwidth.

8. The system of claim 2, wherein the fluid flow comprises blood flow in biological tissue, where hemoglobin containing red blood cells function as the light-absorbing particles.

9. The system of claim 2, wherein the flow information includes one or more of the following: the flow speed, a flow profile, and a flow direction.

* * * * *